United States Patent
Ito et al.

(10) Patent No.: US 6,803,398 B1
(45) Date of Patent: Oct. 12, 2004

(54) THERMOPLASTIC OLEFIN ELASTOMER COMPOSITION

(75) Inventors: Yuichi Ito, Chiba (JP); Hiroyasu Yamaoka, Chiba (JP); Akira Uchiyama, Chiba (JP); Chika Kako, Aichi (JP); Hideo Nishimura, Aichi (JP); Junzo Ukai, Aichi (JP)

(73) Assignees: Mitsui Chemicals, Inc., Tokyo (JP); Toyota Motor Corporation, Aichi (JP)

( * ) Notice: Subject to any disclaimer, the term of this patent is extended or adjusted under 35 U.S.C. 154(b) by 0 days.

(21) Appl. No.: 09/486,368

(22) PCT Filed: Aug. 27, 1998

(86) PCT No.: PCT/JP98/03811

§ 371 (c)(1),
(2), (4) Date: Feb. 28, 2000

(87) PCT Pub. No.: WO99/11705

PCT Pub. Date: Mar. 11, 1999

(30) Foreign Application Priority Data

Aug. 28, 1997 (JP) ............................................. 9-232333

(51) Int. Cl.[7] ................................................. C08K 5/15
(52) U.S. Cl. ........................ 524/114; 524/515; 524/525; 524/528; 524/581
(58) Field of Search ................................ 524/114, 581, 524/515, 525, 528

(56) References Cited

U.S. PATENT DOCUMENTS

| | | | | |
|---|---|---|---|---|
| 4,212,787 A | * | 7/1980 | Matsuda et al. | ............ 260/33.6 |
| 4,871,796 A | * | 10/1989 | Komatsu et al. | ............ 524/474 |
| 4,933,389 A | | 6/1990 | Hikasa et al. | ............ 524/523 |
| 5,081,179 A | * | 1/1992 | Sezaki et al. | ............ 524/526 |
| 5,349,005 A | | 9/1994 | Tanaka | ............ 524/490 |

FOREIGN PATENT DOCUMENTS

| | | | |
|---|---|---|---|
| CA | 0 251 322 | 3/1993 | |
| EP | 0 329 288 A2 | 8/1989 | |
| EP | 0 682 074 A1 | 11/1995 | |
| EP | 0 738 756 A1 * | 10/1996 | ........... C08L/23/02 |
| EP | 0872517 A1 | 10/1998 | |
| JP | 51-145553 A | 12/1976 | |
| JP | 57-085837 A | 5/1982 | |
| JP | 61-036344 | 2/1986 | |
| JP | 01-198648 | 8/1989 | |
| JP | 02-235949 | 9/1990 | |
| JP | 03-188144 | 8/1991 | |
| JP | 04-063850 | 2/1992 | |
| JP | 04-063851 | 2/1992 | |
| JP | 04-063852 | 2/1992 | |
| JP | 04-258639 | 9/1992 | |
| JP | A 5-222214 | 8/1993 | |
| JP | A5-339436 | 12/1993 | |
| JP | A 6-136205 | 5/1994 | |
| JP | 06-212035 | 8/1994 | |
| JP | A 6-287372 | 10/1994 | |
| JP | 07-011067 | 1/1995 | |
| JP | A 8-302103 | 11/1996 | |
| JP | 09-095577 | 4/1997 | |
| JP | A 10-120845 | 5/1998 | |
| WO | WO9817722 | 4/1998 | |

OTHER PUBLICATIONS

Kako et al., Patent Abstracts of Japan, 10–120845 (May 12, 1998).

* cited by examiner

Primary Examiner—Peter D. Mulcahy
(74) Attorney, Agent, or Firm—Birch, Stewart, Kolasch & Birch, LLP

(57) ABSTRACT

An olefin-based thermoplastic elastomer composition comprising a thermoplastic elastomer blended with other resins and rubbers is provided. The thermoplastic elastomer contains polypropylene resin and an olefin-based copolymer rubber, and optionally, a linear polyethylene resin, and the thermoplastic elastomer has been crosslinked to a gel content of 95% or higher. A polyolefin resin, an olefin-based copolymer rubber and a softening agent are further blended with optional inorganic filler to provide the olefin-based thermoplastic elastomer composition. This composition is excellent in oil resistance and extrudability, and well-adapted for use as an energy-saving, resources-saving elastomer in applications including surface or skin material in autoparts, industrial mechanical parts, electric and electronic parts, and construction materials.

2 Claims, No Drawings

US 6,803,398 B1

THERMOPLASTIC OLEFIN ELASTOMER COMPOSITION

This application is the national phase under 35 U.S.C. § 371 of PCT International Application No. PCT/JP98/03811 which has an International filing date of Aug. 27, 1998, which designated the United States of America.

FIELD OF THE INVENTION

This invention relates to an olefin-based thermoplastic elastomer composition, and more specifically, to an olefin-based thermoplastic elastomer composition having excellent oil resistance.

BACKGROUND ART

Olefin-based thermoplastic elastomers are excellent in moldability, flexibility and heat resistance, and their industrial use has expanded in various fields because of such favorable properties. Olefin-based thermoplastic elastomers are also light-weighted and easy to recycle, and such features also backed their use as energy-saving, resources-saving elastomeric substitutes for vulcanized rubbers in the field of auto-parts, industrial mechanical parts, electric and electronic parts, construction materials, and the like.

Olefin-based thermoplastic elastomers, however, suffered from the problem of insufficient oil resistance, and when they are brought in contact with a non-polar solvent such as an aromatic organic solvent, gasoline and mineral oil, they undergo swelling. Such drawback resulted in their limited use.

In view of the situation as described above, an object of the present invention is to solve the problems associated with the prior art, and to provide an olefin-based thermoplastic elastomer composition which has excellent oil resistance as well as excellent moldability.

DISCLOSURE OF THE INVENTION

According to the present-invention, there is provided an olefin-based thermoplastic elastomer composition comprising (I) 100 parts by weight of an elastomer containing (A) 20 to 90 parts by weight of a polypropylene resin having a melt flow rate 0.1 to 5 g/10 min when the melt flow rate is measured under the load of 2.16 kg and the temperature of 230° C. in accordance with ASTM D1238, and (C) 10 to 80 parts by weight of an olefin-based copolymer rubber ((A)+(C)=100 parts by weight), and which has been crosslinked to a gel content of at least 95%;

(D) 10 to 300 parts by weight of a polyolefin-based resin;

(E) 10 to 300 parts by weight of an olefin-based copolymer rubber; and (F) 10 to 300 parts by weight of a softening agent; wherein weight difference ($\Delta W$) of said composition before and after immersing in liquid paraffin at 100° C. for 24 hours is up to 150%.

According to the present invention, there is also provided an olefin-based thermoplastic elastomer composition comprising (I) 100 parts by weight of an elastomer containing (A) 20 to 90 parts by weight of a polypropylene resin having a melt flow rate 0.1 to 5 g/10 min when the melt flow rate is measured under the load of 2.16 kg and the temperature of 230° C. in accordance with ASTM D1238, (B) 5 to 30 parts by weight of a linear polyethylene resin having a density of 0.920 to 0.950 g/cm$^3$, and (C) 5 to 75 parts by weight of an olefin-based copolymer rubber ((A)+(B)+(C)=100 parts by weight), and which has been crosslinked to a gel content of at least 95%;

(D) 10 to 300 parts by weight of a polyolefin-based resin;

(E) 10 to 300 parts by weight of an olefin-based copolymer rubber; and (F) 10 to 300 parts by weight of a softening agent; wherein weight difference ($\Delta W$) of said composition before and after immersing in liquid paraffin at 100° C. for 24 hours is up to 150%.

According to a preferred embodiment of the present invention, there is also provided an olefin-based thermoplastic elastomer composition wherein the composition contains the components (A) and (C), or the components (A), (B) and (C) as the elastomer (I) which has been produced by crosslinking said components by dynamic heat treatment in the presence of an organic peroxide.

Next, the olefin-based thermoplastic elastomer composition of the present invention (hereinafter referred to as the present composition) is described in detail.

The polypropylene resin (A) which is the a critical component of the present composition is a polymer containing propylene as its main component, and exemplary such polypropylene resin (A) include:

(1) propylene homopolymer, (2) a random copolymer of propylene with up to 10% by mole of an $\alpha$-olefin other than propylene, and (3) a block copolymer of propylene with up to 30% by mole of an $\alpha$-olefin other than propylene.

Exemplary such $\alpha$-olefins other than propylene include ethylene, 1-butene, 4-methyl-1-pentene, 1-hexene, and 1-octene, and the polymer may include such $\alpha$-olefin either alone or in combination of two or more. The polypropylene resin (A) may include the polymers as described above either alone or in combination of two or more. Of the polymers as described above, the preferred is the propylene homopolymer.

In view of the improved oil resistance and sufficient moldability of the resulting olefin-based thermoplastic elastomer composition, the polypropylene resin (A) is preferably the one having a melt flow rate of 0.1 to 5 g/10 min, and more preferably 0.5 to 3 g/10 min when the melt flow rate is measured under the load of 2.16 kg and at a temperature of 230° C. in accordance with ASTM D1238.

The linear polyethylene resin (B) used as a constituent of the present composition is typically a random copolymer of ethylene with an ($\alpha$-olefin containing 3 to 10 carbon atoms. Use of a linear polyethylene resin results in the improved compatibility between the propylene resin (A) and the olefin-based copolymer rubber (C), and in particular, in the improved extrudability of the resulting composition. Exemplary $\alpha$-olefins containing 3 to 10 carbon atoms include propylene, 1-butene, 4-methyl-1-pentene, 1-hexene, and 1-octene, and the preferred among these are 4-methyl-1-pentene and 1-hexene. The random copolymer of the ethylene with such $\alpha$-olefin may contain either one or two or more of such an $\alpha$-olefin. The linear polyethylene resin is preferably an ethylene/4-methyl-1-pentene random copolymer.

The $\alpha$-olefin is copolymerized in the polyethylene resin (B) preferably in an amount of 1 to 8% by mole, and more preferably, in an amount of 2 to 5% by mole.

The polyethylene resin (B) has a density of 0.920 to 0.950 g/cm$^3$, and preferably, a density of 0.925 to 0.945 g/cm$^3$.

When the density is less than 0.920 g/cm$^3$, the resulting olefin-based thermoplastic elastomer composition suffers from insufficient oil resistance and the object of the present invention will not be attained. Therefore, the limitation of the density is important.

In addition, the polyethylene resin (B) may preferably have a melt flow rate (MFR) of 0.1 to 50 g/10 min, and most preferably, a melt flow rate of 1 to 30 g/10 min when evaluated in accordance with ASTM D1238 under the load of 2.16 kg and at a temperature of 190° C. The melt flow rate in excess of 50 g/10 min results in the insufficient oil resistance while the melt flow rate of less than 0.1 g/10 min results in the insufficient moldability.

The olefin-based copolymer rubber (C) which is a critical component of the present invention may be a copolymer rubber containing an α-olefin as its main component. This copolymer rubber is an amorphous, random, elastic copolymer such as an α-olefin copolymer comprising two or more α-olefins containing 2 to 20 carbon atoms, and an α-olefin/nonconjugated diene copolymer comprising two or more α-olefins containing 2 to 20 carbon atoms and a nonconjugated diene.

Exemplary olefin-based copolymer rubbers include:
(1) Copolymer rubber of ethylene and an α-olefin other than ethylene
  [Ethylene/α-olefin other than ethylene (molar ratio)=90/10 to 50/50]
(2) Copolymer rubber of ethylene, an α-olefin other than ethylene, and a nonconjugated diene
  [Ethylene/α-olefin other than ethylene (molar ratio)=90/10 to 50/50]
  [Ethylene/nonconjugated diene (molar ratio)=99/1 to 90/10]
(3) Copolymer rubber of propylene and an α-olefin other than propylene
  [Propylene/α-olefin other than propylene (molar ratio)=90/10 to 50/50]
(4) Copolymer rubber of butene and an α-olefin other than butene
  [Butene/α-olefin other than butene (molar ratio)=90/10 to 50/50]

Exemplary α-olefins include ethylene, propylene, 1-butene, 4-methyl-1-pentene, 1-hexene, 1-octene, and the like.

Exemplary nonconjugated dienes include dicyclopentadiene, 1,4-hexadiene, cyclooctadiene, methylene norbornene, ethylidene norbornene, and the like.

The copolymer rubbers (1) to (4) as described above may preferably have a Mooney viscosity [ML$_{1+4}$(100° C.)] of 10 to 250, and most preferably, 30 to 150. The copolymer rubber (2) of ethylene, α-olefin other than ethylene and a nonconjugated diene may preferably have an iodine value of up to 25.

In the present invention, the content of the polypropylene resin (A) in the elastomer (I) is 20 to 90 parts by weight, and preferably 20 to 60 parts by weight based on 100 parts by weight of total ((A)+(C)) of the polypropylene resin (A) and the olefin-based copolymer rubber (C) or 100 parts by weight of total ((A)+(B)+(C)) of the polypropylene resin (A), the linear polyethylene resin (B), and the olefin-based copolymer rubber (C).

When the polypropylene resin (A) is used in such amount, the resulting olefin-based thermoplastic elastomer composition will exhibit excellent resistance to oil and heat as well as good extrudability.

In the present invention, content of the polyethylene resin (B) in the elastomer (I) is 5 to 30 parts by weight, and preferably 5 to 20 parts by weight based on 100 parts by weight of total ((A)+(B)+(C)) of the polypropylene resin (A) and the linear polyethylene resin (B) as described above and the olefin-based copolymer rubber (C) as described below. When the polyethylene resin (B) is used in such amount, the resulting olefin-based thermoplastic elastomer composition will exhibit excellent resistance to oil and heat as well as good extrudability.

In the present invention, content of the olefin-based copolymer rubber (C) in the elastomer (I) is 5 to 75 parts by weight, and preferably 20 to 75 parts by weight based on 100 parts by weight of total ((A)+(B)+(C)) of the polypropylene resin (A), the linear polyethylene resin (B) and the olefin-based copolymer rubber (C). Content of the olefin-based copolymer rubber (C) free from the polyethylene resin (B) is 10 to 80 parts by weight, and preferably 20 to 75 parts by weight based on 100 parts by weight of total ((A)+(C)) of the polypropylene resin (A) and the olefin-based copolymer rubber (C).

When the olefin-based copolymer rubber (C) is used in such amount, the resulting olefin-based thermoplastic elastomer composition will exhibit excellent oil resistance as well as sufficient flexibility.

In the present invention, the olefin-based copolymer rubber (C) may be used in combination with a rubber other than the olefin-based copolymer rubber (C), for example, a diene rubber such as styrene/butadiene rubber (SBR), nitrile rubber (NBR), natural rubber (NR), or butyl rubber (IIR), or a polyisobutyrene rubber of the amount that does not adversely affect the merits of the present invention.

The elastomer (I) of the present invention is an olefin-based thermoplastic elastomer which contains the polypropylene resin (A) and the olefin-based copolymer rubber (C), or the polypropylene resin (A), the linear polyethylene resin (B) and the olefin-based copolymer rubber (C) at a particular content, and which has been crosslinked to a gel content of at least 95% by weight.

The elastomer (I) of the present invention may preferably have a melt flow rate (MFR) of 10 to 300 g/10 min, and most preferably, a melt flow rate of 20 to 200 g/10 min when evaluated in accordance with ASTM D1238 under the load of 10 kg and at a temperature of 230° C.

The term "gel content" used herein is the polymer content which is insoluble in cyclohexane, and the gel content is measured as described below and calculated by the equation (1) as described below. First, a sample of about 100 mg of the olefin-based thermoplastic elastomer is weighed, and the sample is cut into small pieces of 0.5 mm×0.5 mm×0.5 mm. The small pieces are immersed in 30 ml of cyclohexane in a sealed container at 23° C. for 48 hours.

Next, the sample is moved onto a filter paper and dried at room temperature for more than 72 hours until the sample weight is settled. The weight of the cyclohexane-insoluble component other than the polymer component (fibrous filler, filler, pigment, and the like) is subtracted from the weight of the dried residue to obtain "corrected final weight (Y)". The amount of the cyclohexane-insoluble component other than the polymer component is preliminarily calculated from the design values.

In the meanwhile, the weight of the cyclohexane-soluble component other than the polymer component (such as the softening agent) and the weight of the cyclohexane-insoluble component other than the polymer component (fibrous filler, filler, pigment, and the like) are subtracted from the sample weight to obtain "corrected initial weight (X)". The amount of the cyclohexane-soluble component other than the polymer component is preliminarily calculated from the design values.

The gel content (cyclohexane-insoluble component) is calculated by the following equation (1):

$$\text{Gel content (\% by weight)} = (\text{corrected final weight }(Y)) \div (\text{corrected initial weight }(X)) \times 100 \quad (1)$$

The elastomer (I) of the present invention has been crosslinked to a gel content of 95% or higher. For the purpose of further improvement in the oil resistance, the elastomer (I) is preferably crosslinked to a gel content of 97% or higher. The gel content may exceed 100% by weight, for example, when the cyclohexane-soluble component doest not completely dissolve in the cyclohexane.

The thermoplastic elastomer (I) is produced by blending the polypropylene resin (A) and the olefin-based copolymer rubber (C); or the polypropylene resin (A), the linear polyethylene resin (B) and the olefin-based copolymer rubber (C) at the particular blend ratio as described above, and crosslinking the mixture by a dynamic heat treatment in the presence of an organic peroxide.

Exemplary organic peroxides include dicumylperoxide, di-tert-butylperoxide, 2,5-dimethyl-2,5-di-(tert butylperoxy)hexane, 2,5-dimethyl-2,5-di-(tert-butylperoxy)-hexyne-3,1,3-bis(tert-butylperoxyisopropyl)benzene, 1,1-bis(tert-butylperoxy)-3,3,5-trimethylcyclohexane, n-butyl-4,4-bis(tert-butylperoxy)valerate, benzoylperoxide, p-chlorobenzoylperoxide, 2,4-dichlorobenzoylperoxide, tert-butylperoxybenzoate, tert-butylperoxyisopropylcarbonate, diacetylperoxide, lauroylperoxide, and tert-butylcumyl-peroxide.

Among these, the preferred in view of odor and scorching stability are 2,5-dimethyl-2,5-di-(tert butylperoxy)hexane, 2,5-dimethyl-2,5-di-(tert-butylperoxy)-hexyne-3,1,3-bis(tert-butylperoxyisopropyl)benzene, 1,1-bis(tert-butylperoxy)-3,3,5-trimethylcyclohexane, and n-butyl-4,4-bis(tert-butylperoxy)valerate. Among these, the most preferred are 1,3-bis(tert-butylperoxyisopropyl)benzene and 2,5-dimethyl-2,5-di-(tert butylperoxy)hexane.

The organic peroxide is blended in an amount of 0.3 to 3 parts by weight, and preferably in an amount of 0.4 to 2 parts by weight per 100 parts by weight of total of the polypropylene resin (A) and the olefin-based copolymer rubber (C) or 100 parts by weight of total of the polypropylene resin (A), the linear polyethylene resin (B), and the olefin-based copolymer rubber (C). When the amount of the organic peroxide is in the range as described above, olefin-based thermoplastic elastomer (I) which has been crosslinked to a gel content of at least 95% is easily obtained.

In the dynamic heat treatment as described above, sulfur; a peroxy crosslinking aid such as p-quinonedioxime, p,p'-dibenzoylquinonedioxime, N-methyl-N-4-dinitrosoaniline, nitrosobenzene, diphenylquanidine, or trimethylolpropane-N, N'-m-phenylenedimaleimide; divinylbenzene; triallylcyanurate; a polyfunctional methacrylate monomer such as ethylene glycol dimethacrylate, diethylene glycol dimethacrylate, polyethylene glycol dimethacrylate, trimethylol propane trimethacrylate, or allylmethacrylate; a polyfunctional vinyl monomer such as vinylbutylate, or vinylstearate; or the like may be added to the reaction system. These components may be added either alone or in combination of two or more. Use of such compound facilitates uniform and mild crosslinking reaction.

Of the compounds as described above, use of divinylbenzene is most preferable since divinylbenzene is easy to handle and highly compatible with the polypropylene resin (A), the linear polyethylene resin (B), and the olefin-based copolymer rubber (C). Divinylbenzene also has the function of solubilizing the organic peroxide and acts as a dispersing agent of the organic peroxide. As a consequence, use of divinylbenzene results in uniform crosslinking in the heat treatment, and the resulting olefin-based thermoplastic elastomer (I) has well balanced flow properties and physical properties.

The crosslinking aid or the polyfunctional vinyl monomer may be blended preferably in an amount of 0.2 to 3 parts by weight, and in particular, 0.3 to 2 parts by weight based on 100 parts by weight of the total of the polypropylene resin (A) and the olefin-based copolymer rubber (C) or 100 parts by weight of the total of the polypropylene resin (A), the linear polyethylene resin (B), and the olefin-based copolymer rubber (C). When the crosslinking aid or the polyfunctional vinyl monomer is blended in the amount within the above-specified range, the crosslinking aid or the polyfunctional vinyl monomer does not remain as unreacted monomer in the resulting olefin-based thermoplastic elastomer (I), and the resulting olefin-based thermoplastic elastomer (I) will not undergo change in physical properties by thermal hysteresis in the extrusion and molding and will also exhibit high fluidity.

The dynamic heat treatment as described above is accomplished by melt kneading the components as described above in the presence of an organic peroxide, and the treatment may be carried out in a kneading system such as mixing rolls, an intensive mixer (for example, Bambury mixer, kneader, etc.), a single-screw or twin-screw extruder, or the like, and preferably, in a non-open type kneading system. Also, the dynamic heat treatment is preferably carried out in an inert gas such as nitrogen.

The kneading is preferably carried out at a temperature at which the half life of the organic peroxide used is less than 1 minute. To be more specific, the kneading is preferably carried out at a temperature in the range of 150 to 280° C., and most preferably 170 to 240° C. The mixture is kneaded for 1 to 20 minutes, and most preferably, for 1 to 5 minutes. The shearing force applied in kneading is typically 10 to $10^4$ sec$^{-1}$, and most preferably $10^2$ to $10^4$ sec$^{-1}$ at a normal shear rate.

The polyolefin resin (D) which is a critical component of the present invention may be an olefin polymer such as a homopolymer of an α-olefin or a copolymer of two or more α-olefins. Exemplary polyolefin resins include homopolymers and copolymers of an α-olefin such as ethylene, propylene, 1-butene, 1-pentene, 1-hexene, 1-octene, 1-decene, 4-methyl-1-pentene, and 3-methyl-1-pentene. Among these, the preferred are homopolymers of ethylene, propylene and 1-butene, and copolymers containing ethylene, propylene or 1-butene as its main component.

The polyolefin resin (D) may preferably have a melt flow rate (MFR) of 0.1 to 50 g/10 min, and most preferably, a melt flow rate of 0.3 to 30 g/10 min when evaluated in accordance with ASTM D1238 under the load of 2.16 kg. The melt flow rate in excess of 50 g/10 min results in the insufficient oil resistance while the melt flow rate of less than 0.1 g/10 min results in the insufficient moldability.

In the present invention, content of the polyolefin resin (D) is 10 to 300 parts by weight, and preferably 15 to 100 parts by weight per 100 parts by weight of the elastomer (I). When the content of the polyolefin resin (D) is in such range, the resulting olefin-based thermoplastic elastomer composition will exhibit excellent resistance to oil and heat as well as good extrudability.

The olefin-based copolymer rubber (E) which is a critical component of the present invention may be a copolymer rubber containing an α-olefin as its main component. This copolymer rubber is an amorphous, random elastic copolymer, and typical such copolymers include an α-olefin copolymer comprising two or more α-olefins containing 2 to 20 carbon atoms, and an α-olefin/nonconjugated diene copolymer comprising two or more α-olefins containing 2 to 20 carbon atoms and a nonconjugated diene.

Exemplary olefin-based copolymer rubbers include:
(1) Copolymer rubber of ethylene and an α-olefin other than ethylene
  [Ethylene/(α-olefin other than ethylene (molar ratio)=90/10 to 50/50]
(2) Copolymer rubber of ethylene, an α-olefin other than ethylene, and a nonconjugated diene [Ethylene/α-olefin other than ethylene (molar ratio)=90/10 to 50/50]
  [Ethylene/nonconjugated diene (molar ratio)=99/1 to 85/15]
(3) Copolymer rubber of propylene and an α-olefin other than propylene
  [Propylene/α-olefin other than propylene (molar ratio)= 90/10 to 50/50]
(4) Copolymer rubber of butene and an α-olefin other than butene
  [Butene/α-olefin other than butene (molar ratio)=90/10 to 50/50]

Exemplary α-olefins include ethylene, propylene, 1-butene, 4-methyl-1-pentene, 1-hexene, 1-octene, and the like. Exemplary nonconjugated dienes include dicyclopentadiene, 1,4-hexadiene, cyclooctadiene, methylene norbornene, ethylidene norbornene, and the like.

The copolymer rubber of the above (1) to (4) may preferably have a melt flow rate of 0.1 to 5 g/10 min, and most preferably, a melt flow rate of 0.2 to 2 g/10 min when evaluated in accordance with ASTM D1238 under the load of 2.16 kg and at a temperature of 190° C.

Among the copolymer rubber as described above, the olefin-based copolymer rubber (E) is preferably an ethylene/propylene copolymer rubber, and more preferably the one having a molar ratio of ethylene to propylene (ethylene/propylene molar ratio) in the range of 15/85 to 50/50.

In the present invention, the content of the olefin-based copolymer rubber (E) is preferably in the range of 10 to 300 parts by weight, and most preferably 10 to 100 parts by weight based on 100 parts by weight of the elastomer (I). When the content of the olefin-based copolymer rubber (E) is within such range, the resulting olefin-based thermoplastic elastomer composition will be capable of providing an extruded article having excellent oil resistance and high flexibility.

In the present invention, the olefin-based copolymer rubber (E) may be used in combination with a rubber other than the olefin-based copolymer rubber (E), for example, a diene rubber such as styrene/butadiene rubber (SBR), nitrile rubber (NBR), natural rubber (NR), or butyl rubber (IIR), or a polyisobutyrene rubber of the amount that does not adversely affect the merits of the present invention.

The softening agent (F) which is a critical component in the present composition may be a softening agent commonly used in the production of rubbers. Exemplary such softening agent include petroleum substances such as process oil, lubricating oil, paraffin, liquid paraffin, polyethylene wax, polypropylene wax, petroleum asphalt, and vaseline; coal tars such as coal tar and coal tar pitch; fatty oils such as castor oil, linseed oil, rape-seed oil, soybean oil, and palm oil; waxes such as tall oil, beeswax, carnauba wax, and lanolin; fatty acids such as licinoleic acid, palmitic acid, stearic acid, 12-stearic hydroxide, montanic acid, oleic acid, and erucic acid, or metal salts thereof; synthetic polymers such as petroleum resin, coumarone indene resin, and atactic polypropylene; ester plasticizers such as dioctyl phthalate, dioctyl adipate, and dioctyl sebacate; microcrystalline wax, liquid polybutadiene or modified product or hydrogenate thereof, liquid Thiokol (trade mark), and the like.

In the present invention, content of the softening agent (F) is 10 to 300 parts by weight, preferably 15 to 200 parts by weight, and more preferably 20 to 150 parts by weight per 100 parts by weight of the elastomer (I). When the content of the softening agent (F) is in such range, the resulting olefin-based thermoplastic elastomer composition can be extruded into an article having excellent oil resistance and flexibility.

Although the composition of the present invention is the one comprising the elastomer (I), the polyolefin resin (D), the olefin copolymer rubber (E), and the softening agent (F), the composition may further comprise an inorganic filler (G) as described below.

The inorganic filler (G) which may be used include glass fiber, potassium titanate fiber, carbon fiber, calcium carbonate, calcium silicate, clay, kaolin, talc, silica, diatomaceous earth, powdered mica, asbestos, alumina, barium sulfate, aluminum sulfate, calcium sulfate, magnesium carbonate, molybdenum disulfide, graphite, glass beads, shirasu balloon and the like. In the present composition, content of the inorganic filler (G) is in the range of 0 to 300 parts by weight, preferably 0 to 200 parts by weight, and most preferably 0 to 100 parts by weight per 100 parts by weight of the elastomer (I).

In addition to the components as described above, the present composition may contain a thermal stabilizer, an anti-aging agent, weathering agent, an antistatic agent, a colorant, a lubricant, and other additives in the amounts that does not adversely affect the merits of the invention.

The composition of the present invention is preferably produced by blending the elastomer (I), the polyolefin resin (D), the olefin-based copolymer rubber (E), and the softener (F), and optionally, the inorganic filler (G) at the particular mixing ratio as described above and further adding other optional additives; and subjecting the mixture to a dynamic heat treatment under the absence of the organic peroxide.

The dynamic heat treatment as described above is accomplished by melt kneading the components as described above, and the treatment may be carried out in a kneading system such as mixing rolls, an intensive mixer (for example, Bambury mixer, kneader, etc.), a single-screw or twin-screw extruder, and the like, and preferably, in a non-open type kneading system. Also, the dynamic heat treatment is preferably carried out in an inert gas such as nitrogen. The components may be separately fed to the kneading system. Alternatively, some or all of the components may be mixed before feeding to the kneading system. The inorganic filler (G) is preferably mixed with other components before feeding to the kneading system.

The kneading is carried out at a temperature higher than the melting temperatures of the components as described above. To be more specific, the kneading is preferably carried out at a temperature in the range of 150 to 280° C., and most preferably 170 to 240° C. for a period of 0.1 to 20 minutes, and most preferably, for 0.5 to 5 minutes. The shearing force applied in kneading is typically in the range of 10 to $10^4$ sec$^{-1}$, and most preferably $10^2$ to $10^4$ sec$^{-1}$.

The components of the present composition as described above are blended in the amounts as described above as the general range. The components, however, are most preferably blended in the amounts within their preferable range. The composition wherein some components are blended in the amounts within the preferable range and other components are blended in the amounts within the general range are also preferable.

The components of the present composition as described above may be those having the physical property values within the general range. The components, however, are most preferably those having the physical property values within the preferable range. The components wherein some physical property values are within the preferable range and other physical property values are within the general range are also preferable. The composition of the present invention has excellent oil resistance, and experiences reduced degree of swelling when brought in contact with non-polar solvents as aromatic organic solvents, gasoline and mineral oil.

The oil resistance of the present composition as indicated by weight difference ($\Delta W$, percent swell) before and after immersing in liquid paraffin at 100° C. for 24 hours is up to 150%, preferably up to 120%, and more preferably up to 100%.

The present composition has an MFR (at 230° C., under the load of 10 kg) of 0.1 to 150, preferably 0.1 to 140, and most preferably 0.1 to 120. As a consequence, the present composition has excellent flexibility and extrudability, and the composition is highly adapted for use as a skin or surface material.

The present invention of the constitution as described above is also excellent in its appearance after the extrusion in addition to the flexibility and the extrudability, and the present composition also has lightened weight and high adaptability to recycling due to the use of the olefin-based resin.

In addition, since the thermoplastic elastomer (I) used in the production of the present composition is the one which has been crosslinked with an organic peroxide, the present composition has improved extrudability. As a consequence, the present composition is adequate for use as an energy-saving, resources-saving elastomer in a wide variety of applications including car interior and exterior parts, industrial mechanical parts, electric and electronic parts, and construction materials. The present composition is particularly suitable for use as a car interior part and skin materials.

BEST MODE FOR CARRYING OUT THE INVENTION

Next, the present invention is described in further detail by referring to Examples, which by no means limit the scope of the invention. The compounds used in the production of the compositions in the Examples and Comparative Examples are as described below.

<Polypropylene Resin (A)>

(A-1) Propylene Homopolymer

1) MFR (ASTM D 1238-65T; 230° C.; load, 2.16 kg): 1 g/10 min

<Linear Polyethylene Resin (B)>

(B-1) Ethylene/4-methyl-1-pentene Random Copolymer

1) MFR (ASTM D 1238-65T; 230° C.; load, 2.16 kg): 2 g/10 min

2) Density: 0.940 g/cm$^3$ (B-2) Ethylene/4-methyl-1-pentene Random Copolymer

1) MFR (ASTM D 1238-65T; 230° C.; load, 2.16 kg): 2 g/10 min

2) Density: 0.915 g/cm$^3$

<Organic Peroxide>

2,5-dimethyl-2,5-di-(tert-butylperoxy)hexane

<Olefin-based Copolymer Rubber (C)>

(C-1) Ethylene/propylene/5-ethylidene-2-norbornene Copolymer Rubber

1) Ethylene content: 78% by mole

2) Iodine value: 14

3) Mooney viscosity ($ML_{1+4}$, 100° C.): 150

<Polyolefin resin (D)>

(D-1) Propylene Homopolymer

1) MFR (ASTM D 1238-65T; 230° C.; load, 2.16 kg): 0.5 g/10 min (D-2) Ethylene/4-methyl-1-pentene Random Copolymer 1) MFR (ASTM D 1238-65T; 230° C.; load, 2.16 kg): 0.5 g/10 min 2) Density: 0.935 g/cm$^3$ (D-3) 1-butene Homopolymer 1) MFR (ASTM D 1238-65T; 230° C.; load, 2.16 kg): 0.5 g/10 min <Olefin-based Copolymer Rubber (E)>

(E-1) Propylene/ethylene Copolymer Rubber

1) MFR (ASTM D 1238-65T; 230° C.; load, 2.16 kg): 0.3 g/10 min

2) Ethylene content: 40% by mole

<Softening Agent (F)>

(F-1) Mineral Oil-based Process Oil (manufactured by Idemitsu Kosan K.K., PW-380 (trademark)]

<Inorganic Filler (G)>

(G-1) Talc Fine Powder (manufactured by Matsumura Sangyo K.K., ET-5 (trademark))

EXAMPLE 1

<Production of Thermoplastic Elastomer (I)>

25 parts by weight of pellets of propylene homopolymer (A-1), 75 parts by weight of ethylene/propylene/5-ethylidene-2-norbornene copolymer rubber (C-1), 0.4 part by weight of 2,5-dimethyl-2,5-di-(tert-buthylperoxy) hexane, and 0.5 part by weight of divinylbenzene were thoroughly mixed, and the mixture was melt kneaded in a twin-screw extruder equipped with a screw diameter of 50 mm in nitrogen atmosphere and at a temperature of 220° C. for cross linking, and the kneaded mixture was extruded to produce the pellets of thermoplastic elastomer (I).

<Measurement of Gel Content>

Gel content was calculated by the equation (1) as described above after extracting the pellets of thermoplastic elastomer (I) by cyclohexane.

<Production of Olefin-based Thermoplastic Elastomer Composition>

The procedure as described above were repeated except that 100 parts by weight of the resulting pellets of the elastomer (I), 50 parts by weight of the pellets of the propylene homopolymer (D-1), and 40 parts by weight of the pellets of the propylene/ethylene copolymer rubber (E-1) were thoroughly mixed, and 100 parts by weight of mineral oil-based process oil (F-1) was introduced from a side feeder in the extruder as described above to produce pellets of olefin-based thermoplastic elastomer composition.

<Evaluation of Physical Properties>

The resulting olefin-based thermoplastic elastomer composition was evaluated for oil resistance and melt flow rate (MFR) by the procedure as described below, and also, for extrudability and appearance of the extrusion, and sheet extrudability by the procedure as described below.

(1) Oil Resistance

A sheet having a thickness of 2 mm was produced from the pellets of the resulting composition by using a press. A test piece of 20×20 mm (length×width) was cut out from the sheet. The test piece was immersed in liquid paraffin at 100° C. for 24 hours, and percentage weight difference (ΔW %) before and after the immersion was measured to evaluate the oil resistance. The results are shown in Table 1.

(2) Melt Flow Rate (MFR)

The pellets were evaluated for their melt flow rate in accordance with ASTM D1238 at 230° C. under the load of 10 kg. The results are shown in Table 1.

(3) Extrudability and Appearance of the Extruded Article

A single-screw extruder equipped with a screw having a diameter of 50 mm was mounted with a die used in ASTM D 2230-90 (Garvey type), and the composition was extruded to obtain the extruded article.

[Extrusion Conditions]

Temperature settings: C1/C2/C3/C4/C5/H/D=160/180/200/220/220/220/200° C.

Screw revolution: 45 rpm

Screen mesh: 40/80/40 mesh

The appearance of the extruded article was evaluated by observing the skin, and the extrudability was evaluated by observing the edges. The results shown in the table were determined by the criteria as described below.

[Criteria]

○: good; Δ: not so good; x:poor

The results of the evaluation are shown in Table 1.

(4) Sheet Extrudability

A single-screw extruder equipped with a screw having a diameter of 65 mm was mounted with a T die of coat hanger type, and the composition was extruded under the conditions as described below to obtain a sheet with the sheet thickness of 0.5 mm (lip opening of the T die: 0.7 mm).

[Extrusion Conditions]

Temperature settings: C1/C2/C3/C4/C5/C6/C7/C8/H/D= 160/180/200/200/200/200/200/200/200/200° C.

Screw revolution: 50 rpm

Screen mesh: 40/80/40 mesh

The composition was extruded under the conditions as described above, and the resulting sheet was evaluated for extrusion stability such as the stability of the sheet thickness and convenience of take up as well as the surface conditions of the resulting sheet. The results shown in the table were determined by the criteria as described below.

[Criteria]

○: good; Δ: not so good; x:poor

The results of the evaluation are shown in Table 1.

EXAMPLES 2 TO 12 AND COMPARATIVE EXAMPLES 1 TO 12

Thermoplastic elastomers (I) were produced and the gel content was calculated by repeating the procedure of Example 1 except that the components and the compositional ratio of the elastomer (I) of Example 1 were changed as shown in Table 1. Also, the thermoplastic elastomer compositions were produced and extruded by repeating the procedure of Example 1 except that the components and the compositional ratio of the composition of Example 1 were changed as shown in Table 1 to evaluate the physical properties of the compositions as well as the extrusions and the extruded sheets. The results are shown in Table 1.

TABLE 1

| | Example | | | | | |
|---|---|---|---|---|---|---|
| | 1 | 2 | 3 | 4 | 5 | 6 |
| Elastomer (I) (part by weight) | | | | | | |
| A-1 (PP) | 25 | 30 | 30 | 30 | 30 | 60 |
| B-1 (LLDPE) | 0 | 0 | 0 | 0 | 0 | 0 |
| B-2 (LLDPE) | 0 | 0 | 0 | 0 | 0 | 0 |
| C-1 (EPDM) | 75 | 70 | 70 | 70 | 70 | 40 |
| Organic peroxide | 0.4 | 1.0 | 1.0 | 1.0 | 1.0 | 1.0 |
| Divinylbenzene | 0.5 | 0.8 | 0.8 | 0.8 | 0.8 | 0.8 |
| Gel content (%) | 96 | 99 | 99 | 99 | 99 | 99 |
| Thermoplastic elastomer composition | | | | | | |
| D-1 (PP) | 50 | 50 | 0 | 0 | 50 | 20 |
| D-2 (LLDPE) | 0 | 0 | 50 | 0 | 0 | 0 |
| D-3 (PB) | 0 | 0 | 0 | 50 | 0 | 0 |
| E-1 (PER) | 40 | 20 | 20 | 20 | 20 | 20 |
| E-1 (Oil) | 100 | 50 | 50 | 50 | 50 | 20 |
| G-1 (Talc) | 0 | 0 | 0 | 0 | 10 | 0 |
| Oil resistance (wt. %) | 128 | 89 | 98 | 97 | 88 | 72 |
| MFR (g/10 min) | 130 | 180 | 190 | 190 | 150 | 80 |
| Extruded article | | | | | | |
| Extrudability | | | | | | |
| Skin | ○ | ○ | ○ | ○ | ○ | ○ |
| Edge | ○○ | ○ | ○ | ○ | ○ | ○ |
| Sheet extrudability | | | | | | |
| Stability | ○ | X | X | X | Δ | ○ |
| Surface conditions | ○ | ○ | ○ | ○ | ○ | ○ |

| | Example | | | | | |
|---|---|---|---|---|---|---|
| | 7 | 8 | 9 | 10 | 11 | 12 |
| Elastomer (I) (part by weight) | | | | | | |
| A-1 (PP) | 20 | 25 | 25 | 25 | 25 | 60 |
| B-1 (LLDPE) | 5 | 10 | 10 | 10 | 10 | 10 |
| B-2 (LLDPE) | 0 | 0 | 0 | 0 | 0 | 0 |
| C-1 (EPDM) | 75 | 65 | 65 | 65 | 65 | 30 |
| Organic peroxide | 0.4 | 1.0 | 1.0 | 1.0 | 1.0 | 1.0 |
| Divinylbenzene | 0.5 | 0.8 | 0.8 | 0.8 | 0.8 | 0.8 |
| Gel content (%) | 97 | 99 | 99 | 99 | 99 | 99 |
| Thermoplastic elastomer composition | | | | | | |
| D-1 (PP) | 40 | 50 | 0 | 0 | 50 | 20 |
| D-2 (LLDPE) | 0 | 0 | 50 | 0 | 0 | 0 |
| D-3 (PB) | 0 | 0 | 0 | 50 | 0 | 0 |
| E-1 (PER) | 50 | 20 | 20 | 20 | 20 | 20 |
| F-1 (Oil) | 100 | 50 | 50 | 50 | 50 | 20 |
| G-1 (Talc) | 0 | 0 | 0 | 0 | 10 | 0 |
| Oil resistance (wt. %) | 124 | 64 | 71 | 69 | 62 | 53 |
| MFR (g/10 min) | 90 | 120 | 150 | 150 | 100 | 40 |
| Extruded article | | | | | | |
| Extrudability | | | | | | |
| Skin | ○ | ○ | ○ | ○ | ○ | ○ |
| Edge | ○ | ○ | ○ | ○ | ○ | ○ |
| Sheet extrudability | | | | | | |
| Stability | ○ | ○ | Δ | Δ | ○ | ○ |
| Surface conditions | ○ | ○ | ○ | ○ | ○ | ○ |

| | Comparative Example | | | | | |
|---|---|---|---|---|---|---|
| | 1 | 2 | 3 | 4 | 5 | 6 |
| Elastomer (I) (part by weight) | | | | | | |
| A-1 (PP) | 30 | 30 | 30 | 30 | 30 | 60 |
| B-1 (LLDPE) | 0 | 0 | 0 | 0 | 0 | 0 |

TABLE 1-continued

|  | | | | | | |
|---|---|---|---|---|---|---|
| B-2 (LLDPE) | 0 | 0 | 0 | 0 | 0 | 0 |
| C-1 (EPDM) | 70 | 70 | 70 | 70 | 70 | 70 |
| Organic peroxide | 0.15 | 1.0 | 1.0 | 1.0 | 1.0 | 1.0 |
| Divinylbenzene | 0.15 | 0.8 | 0.8 | 0.8 | 0.8 | 0.8 |
| Gel content (%) | 91 | 99 | 99 | 99 | 99 | 99 |
| Thermoplastic elastomer composition | | | | | | |
| D-1 (PP) | 50 | 50 | 50 | 0 | 50 | 0 |
| D-2 (LLDPE) | 0 | 0 | 0 | 0 | 0 | 0 |
| D-3 (PB) | 0 | 0 | 0 | 0 | 0 | 0 |
| E-1 (PER) | 20 | 20 | 0 | 20 | 0 | 0 |
| F-1 (Oil) | 50 | 0 | 50 | 50 | 0 | 0 |
| G-1 (Talc) | 0 | 0 | 0 | 0 | 0 | 0 |
| Oil resistance (wt. %) | 178 | 118 | 78 | 129 | 95 | 128 |
| MFR (g/10 min) | 150 | 90 | 170 | 120 | 50 | 30 |
| Extruded article | | | | | | |
| Extrudability | | | | | | |
| Skin | ○ | ○ | ○ | ○ | ○ | X |
| Edge | ○ | Δ | Δ | Δ | Δ | X |
| Sheet extrudability | | | | | | |
| Stability | Δ | ○ | X | ○ | ○ | ○ |
| Surface conditions | ○ | Δ | Δ | Δ | Δ | X |

|  | Comparative Example | | | | | |
|---|---|---|---|---|---|---|
|  | 7 | 8 | 9 | 10 | 11 | 12 |
| Elastomer (I) (part by weight) | | | | | | |
| A-1 (PP) | 25 | 25 | 25 | 25 | 25 | 60 |
| B-1 (LLDPE) | 10 | 0 | 10 | 10 | 10 | 10 |
| B-2 (LLDPE) | 0 | 10 | 0 | 0 | 0 | 0 |
| C-1 (EPDM) | 65 | 65 | 65 | 65 | 65 | 30 |
| Organic peroxide | 0.15 | 1.0 | 1.0 | 1.0 | 1.0 | 1.0 |
| Divinylbenzene | 0.15 | 0.8 | 0.8 | 0.8 | 0.8 | 0.8 |
| Gel content (%) | 93 | 99 | 99 | 99 | 99 | 99 |
| Thermoplastic elastomer composition | | | | | | |
| D-1 (PP) | 50 | 50 | 0 | 50 | 50 | 0 |
| D-2 (LLDPE) | 0 | 0 | 0 | 0 | 0 | 0 |
| D-3 (PB) | 0 | 0 | 0 | 0 | 0 | 0 |
| E-1 (PER) | 20 | 20 | 20 | 0 | 20 | 0 |
| F-1 (Oil) | 50 | 50 | 50 | 50 | 0 | 0 |
| G-1 (Talc) | 0 | 0 | 0 | 0 | 0 | 0 |
| Oil resistance (wt. %) | 173 | 195 | 78 | 51 | 98 | 43 |
| MFR (g/10 min) | 80 | 120 | 90 | 150 | 30 | 20 |
| Extruded article | | | | | | |
| Extrudability | | | | | | |
| Skin | ○ | ○ | ○ | ○ | ○ | X |
| Edge | ○ | Δ | Δ | Δ | Δ | X |
| Sheet extrudability | | | | | | |
| Stability | ○ | ○ | Δ | Δ | ○ | ○ |
| Surface conditions | ○ | ○ | Δ | Δ | Δ | X |

The unit of the content of each component is part by weight.

A-1: propylene homopolymer (PP), MFR 1

B-1: ethylene/4-methyl-1-pentene random copolymer (LLDPE), density 0.940

B-2: ethylene/4-methyl-1-pentene random copolymer (LLDPE), density 0.915

C-1: ethylene/propylene/5-ethylidene-2-norbornene copolymer rubber (EPDM)

Organic peroxide: 2,5-dimethyl-2,5-di-(tert-butylperoxy) hexane

D-1: propylene homopolymer (PP), MFR 0.5

D-2: ethylene/4-methyl-1-pentene random copolymer (LLDPE), density 0.935

D-3: 1-butene homopolymer (PB)

E-1: propylene-ethylene copolymer rubber (PER)

F-1: mineral oil based process oil

G-1: talc fine powder

Industrial Utility

The olefin-based thermoplastic elastomer composition of the present invention contains a thermoplastic elastomer comprising polypropylene resin, an olefin-based copolymer rubber, and a linear polyethylene resin as an optional component, and which is crosslinked to a gel content of at least 95%, and therefore, the composition of the present invention has excellent oil resistance. In addition to the thermoplastic elastomer, the composition of the present invention contains a polyolefin resin, an olefin-based copolymer rubber, and a softening agent, and therefore, the composition enjoys excellent flexibility, extrudability and good appearance of the extruded article.

What is claimed is:

1. A thermoplastic elastomer composition having a weight difference ($\Delta W$) before and after immersing in liquid paraffin at 100° C. for 24 hours of up to 150%, said composition comprising
   (I) 100 parts by weight of an elastomer which has been produced by subjecting a composition containing components (A) and (C) described below to dynamic heat treatment in the presence of an organic peroxide and which has been crosslinked to a gel content of at least 95%:
      (A) 20 to 90 parts by weight of a polypropylene resin having a melt flow rate of 0.1 to 5 g/10 min when the melt flow rate is measured under a load of 2.16 kg and a temperature of 230° C. in accordance with ASTM D1238, and
      (C) 10 to 80 parts by weight of an olefin copolymer rubber, wherein (A)+(C)=100 parts by weight;
   (D) 10 to 300 parts by weight of a polyolefin resin;
   (E) 10 to 300 parts by weight of an olefin copolymer rubber; and
   (F) 10 to 300 parts by weight of a softening agent.

2. A thermoplastic elastomer composition having a weight difference ($\Delta W$) before and after immersing in liquid paraffin at 100° C. for 24 hours of up to 150%, said composition comprising
   (I) 100 parts by weight of an elastomer which has been produced by subjecting a composition containing components (A), (B), and (C) described below to dynamic heat treatment in the presence of an organic peroxide and which has been crosslinked to a gel content of at least 95%:
      (A) 20 to 90 parts by weight of a polypropylene resin having a melt flow rate of 0.1 to 5 g/10 min when the melt flow rate is measured under a load of 2.16 kg and a temperature of 230° C. in accordance with ASTM D1238,
      (B) 5 to 30 parts by weight of a linear polyethylene resin having a density of 0.920 to 0.950 g/cm$^3$, and
      (C) 5 to 75 parts by weight of an olefin copolymer rubber, wherein (A)+(B)+(C)=100 parts by weight;
   (D) 10 to 300 parts by weight of a polyolefin resin;
   (E) 10 to 300 parts by weight of an olefin copolymer rubber; and
   (F) 10 to 300 parts by weight of a softening agent.

* * * * *